US010913330B2

(12) United States Patent
Fischer (10) Patent No.: US 10,913,330 B2
(45) Date of Patent: Feb. 9, 2021

(54) VENTILATION VALVE FOR A VEHICLE

(71) Applicant: ILLINOIS TOOL WORKS INC., Glenview, IL (US)

(72) Inventor: Heiko Fischer, Münchweiler (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 125 days.

(21) Appl. No.: 16/028,008

(22) Filed: Jul. 5, 2018

(65) Prior Publication Data
US 2019/0152295 A1 May 23, 2019

(30) Foreign Application Priority Data
Nov. 22, 2017 (DE) .......................... 10 2017 127 564

(51) Int. Cl.
*B60H 1/24* (2006.01)
*F16K 15/14* (2006.01)
*F16K 17/164* (2006.01)

(52) U.S. Cl.
CPC ............ *B60H 1/249* (2013.01); *F16K 15/147* (2013.01); *F16K 17/164* (2013.01)

(58) Field of Classification Search
CPC ...... B60H 1/249; F16K 17/164; F16K 15/147
USPC ................................................ 454/162–165
See application file for complete search history.

(56) References Cited

U.S. PATENT DOCUMENTS

| 5,167,574 A * | 12/1992 | Ikeda ................. B60H 1/00664 |
| | | 137/512.1 |
| 5,355,910 A * | 10/1994 | Gies ....................... B60H 1/249 |
| | | 137/855 |
| 5,601,117 A | 2/1997 | Lewis |
| 8,328,609 B2 | 12/2012 | Schneider |
| 2009/0280736 A1 | 11/2009 | Schneider |

FOREIGN PATENT DOCUMENTS

| DE | 10 2006 056 868 | 6/2008 |
| DE | 102015224548 A1 * | 8/2016 ............. B60H 1/249 |
| EP | 0728606 | 8/1996 |

* cited by examiner

*Primary Examiner* — Jessica Yuen
(74) *Attorney, Agent, or Firm* — Thompson Hine LLP (57) ABSTRACT

A ventilation valve for a vehicle for letting air out of a vehicle interior includes a valve frame with at least one through opening, and at least one valve flap which is mounted on the valve frame and is adjustable between a closed position and an open position. The at least one valve flap closes the at least one through opening in the closed position and opens up the at least one through opening in the open position. Air escaping through the at least one through opening flows from an air inlet side to an air outlet side along a main flow direction. A wall bounding the at least one through opening is inclined into the air flow in such a manner that the through opening tapers in the main flow direction.

17 Claims, 12 Drawing Sheets

VENTILATION VALVE FOR A VEHICLE

TECHNICAL FIELD

The invention relates to a ventilation valve for ventilating the interior of a vehicle, where the ventilation valve includes a valve frame and a valve flap.

BACKGROUND

A ventilation valve includes a valve frame with at least one through opening, and also at least one valve flap which is mounted on the valve frame and is adjustable between a closed position and an open position, wherein the at least one valve flap closes the at least one through opening in the closed position and opens up the at least one through opening in the open position, wherein air escaping through the at least one through opening flows from an air inlet side to an air outlet side along a main flow direction.

Ventilation valves of this type serve for removing outgoing air from the interior of a vehicle in the event of a positive pressure in relation to the vehicle surroundings occurring in the vehicle interior. Air supplied to the vehicle interior, for example via an aeration system, can thus be removed. In particular, a positive pressure occurring suddenly in the vehicle interior—caused, for example, by the closing of a vehicle door or by the triggering of an airbag—can also be compensated for by the excess air passing through the ventilation valve out of the vehicle interior to the outside. The valve flaps here are arranged in such a manner that they are held in the closed position by gravity. If the pressure in the vehicle interior does not exceed or only slightly exceeds the external pressure, the ventilation flap lies against the valve frame and therefore closes the valve. The intention is thereby to prevent impurities, such as, for example, vehicle exhaust gases, and also noise from entering the vehicle interior. The valve flaps are customarily flexibly configured valve flaps, and consist in particular of rubber tabs or PET films. By means of a positive pressure occurring in the vehicle interior, the valve flaps are deformed counter to gravity, and the through openings are therefore opened up. Ventilation valves of this type are known, for example, from DE 10 2006 056 868 A1 and EP 0 728 606 B1.

However, the operation of known ventilation valves is not always satisfactory. For example, when air is being let out, fluttering of the valve flaps and an associated production of noise occur. In addition, dead water zones impairing the air flow frequently arise on the outer side of the valves.

The invention is therefore based on the object of providing a ventilation valve for a vehicle, which ensures a more efficient conduction of air.

SUMMARY

According to the invention, the ventilation valve explained at the beginning is distinguished by a wall bounding the at least one through opening and being inclined into the air flow in such a manner that the through opening tapers in the main flow direction.

The wall is the inner part of the valve frame that surrounds the at least one through opening. The wall does not have to be fully inclined herein into the air flow. It is sufficient if the wall is inclined at least in sections into the air flow in such a manner that the through opening tapers in the main flow direction. By means of the tapering through opening, the opening cross section of the through opening is reduced in the main flow direction. The wall bounding the through opening can converge in particular in the shape of a funnel. The wall can have, for example, a polygonal, in particular a square, cross section. For example, two opposite wall portions can then be inclined into the air flow in such a manner that the through opening tapers in the main flow direction. The remaining two wall portions do not have to be inclined here into the air flow, but rather can run in particular in the main flow direction. By means of the tapering through opening, the air resistance for the air flow emerging from the ventilation valve is reduced, which can be attributed in particular to an increase in the flow velocity of the air flow. In addition, the inclined wall prevents dead water zones in the air flow. In the prior art, such dead water zones obstructing the air flow occur in particular at the sharp edges between the wall and those elements of the ventilation valve which adjoin the wall. If the air flow emerging from the ventilation valve passes said sharp edges, the formation of vortex zones increasing the air resistance occur, which has a negative effect on the ventilation efficiency. Said vortex zones are referred to here as dead water zones, irrespective of the fact that air is present as the flow medium. The inventors have recognized here that said dead water zones can be avoided by the inclination according to the invention of the wall bounding the through opening. By the wall being inclined into the air flow, sharp edges, in particular right angles, are avoided and the formation of vortices is therefore suppressed. In addition, a fluttering of the at least one valve flap is suppressed, which likewise reduces the air resistance and therefore ensures a more efficient conduction of air. The valve flaps are designed in particular in an elastically deformable manner, and are composed, for example, of rubber, in particular of NBR, of ethylene-propylene-diene rubber (EPDM) or of a thermoplastic elastomer (TPE).

According to one refinement, the ventilation valve comprises a water drainage channel which is arranged in the valve frame on the air outlet side and extends between an outer side of the tapering wall and an outer wall. The outer wall here lies further on the outside with respect to the at least one through opening than the tapering wall; in particular, the outer wall can run in the main flow direction. The water drainage channel serves for removing spray which passes from the outside onto the ventilation valve installed in the vehicle. Known ventilation valves are customarily arranged in the rear of the vehicle in the vicinity of the tires. This is firstly because an air flow supplied by an aeration system in the front of the vehicle can therefore flow through the entire vehicle as far as the rear. Secondly, the ventilation valve arranged in such a manner can be concealed by a rear skirt of the vehicle, which is preferred visually. However, because of the spatial vicinity to the tires of the vehicle, spray frequently accumulates on the outer side of the ventilation valve. Known ventilation valves do indeed sometimes have water drainage channels. However, these generally do not permit a reliable removal of the accumulated water; in particular, in the case of water drainage channels of known ventilation valves, accumulated water frequently enters the vehicle interior through the through opening. The inventors have recognized that, in the case of known ventilation valves, such an entry of water which has accumulated in the water drainage channel into the vehicle interior occurs because of capillary effects. The accumulated water rises up here on the outside on the wall of the through opening—said wall running in the main flow direction in the prior art—and passes into the vehicle interior through the through opening. This occurs in the prior art to a particularly great extent if a water drainage channel is not provided. Water then collects on a surface which runs between the wall and the outer wall and is approximately parallel to a supporting surface of the at least one valve flap. Owing to the wall which is inclined according to the invention into the air flow, said capillary effects are suppressed, which, in an advantageous manner, prevents or at least reduces an entry of water into the vehicle interior.

According to a further refinement, the ventilation valve comprises at least one rib extending through the at least one through opening perpendicular to the main flow direction for holding back the at least one valve flap during a movement counter to the main flow direction, wherein the at least one rib is rounded on a downstream end edge and/or on an upstream end edge. According to this refinement, one or more ribs are provided which extend in particular transversely or longitudinally through the through opening. In the installed state of the ventilation valve, the ribs can run in particular vertically or horizontally here. In the closed position, the at least one valve flap lies against the valve frame. In the case of a force acting on the valve flap counter to the main flow direction, the valve flap can also lie against the at least one rib. Such a force can arise in particular because of a negative pressure acting in the vehicle interior. The at least one rib serves here for holding back the elastically configured valve flap in order to prevent an (excessive) deformation of the valve flap in the direction of the through opening. The at least one rib extends here from an upstream end edge to a downstream end edge, preferably along the main flow direction through the at least one through opening. A rounding of the end edge(s) makes it possible to reduce vortices and to avoid dead water zones in the air flow. This further improves the air throughput through the ventilation valve. The two end edges are preferably rounded, and therefore the ribs have a wing shape.

According to one refinement, the wall bounding the at least one through opening has rounded edges. In particular in the case of polygonal, for example square, walls, an increased air resistance can occur in the edges of the wall running between the air inlet side and the air outlet side. This impairs the air flow. This is avoided by rounding the edges, which increases the efficiency of the air flow.

According to a further refinement, arrow-shaped mounting pins running in the main flow direction are arranged on the valve frame for attaching the at least one valve flap, wherein the at least one valve flap has receiving openings corresponding to the mounting pins. The arrow-shaped mounting pins comprise in particular a frame-side arrow shaft and an arrow head at its free end. For attaching the at least one valve flap to the valve frame, the receiving openings of the valve flap are brought to coincide with the mounting pins and the valve flap is pressed onto the valve frame, wherein the mounting pins pass through their respectively corresponding receiving openings in the valve flap. In particular if the ventilation valve has a plurality of through openings which are each closed by a valve flap, because of the mounting pins running in the main flow direction, the space required for the fastening of the valve flaps can be reduced and therefore the through openings can be enlarged. This leads to an increased air throughput. In addition, the mounting of the at least one valve flap is simplified by the arrow-shaped design of the mounting pins since said at least one valve flap merely has to be pressed against the frame such that the arrow heads of the mounting pins pass through the corresponding receiving openings. Finally, the arrow-shaped mounting pins also simplify an opening of the valve flap by the air flow and therefore increase the air throughput. This is achieved by an appropriate choice of the length of the arrow shafts that runs in the main flow direction. The greater the ratio of the length of the arrow shafts to the thickness of the valve flap, the more movement clearance is available to the valve flap in the main flow direction. On account of said movement clearance, the at least one valve flap can be adjusted more easily into the open position. The movement clearance—and therefore the force to be applied for opening the valve flap—can be set as desired by the ratio of the length of the arrow shafts holding the valve flap on the valve frame to the thickness of the valve flap. However, it should be ensured here that the valve flap still provides a reliable seal in relation to the valve frame in the closed position. The at least one valve flap can also have a movement clearance in a direction perpendicular to the main flow direction, said movement clearance being able to serve in particular for compensating for manufacturing tolerances. In an installed state of the ventilation valve, the movement clearance can be provided in particular in the horizontal. Said movement clearance can be set by the ratio of the width of the receiving openings of the valve flap to the width of the arrow shafts.

According to one refinement, the ventilation valve also comprises at least one centering pin which is arranged on the valve frame and runs in the main flow direction for centering the at least one valve flap during the attaching to the valve frame, wherein the at least one valve flap has at least one receiving opening corresponding to the centering pin. In particular, the centering pin can also be configured to be arrow-shaped, corresponding to the above-explained mounting pins. In a direction perpendicular to the main flow direction, the centering pin of the valve flap can in particular here create a smaller play than the mounting pins, wherein the ratio of the width of the arrow shaft of the centering pin to the width of the corresponding receiving opening is smaller than the above-described ratio of the width of the arrow shafts of the mounting pins to the width of the receiving openings corresponding thereto. The centering pin therefore helps during the attaching of the at least one valve flap to the valve frame, but requires a higher degree of manufacturing accuracy than the mounting pins. By contrast, the mounting pins permit a greater manufacturing tolerance.

According to a further refinement, the ventilation valve comprises a channel which runs horizontally above the mounting pins in the installed state of the ventilation valve. Said channel forms a clearance for receiving that end of the at least one valve flap which is mounted on the mounting pins during the movement of the valve flap from the closed position into the open position. During an opening movement of the valve flap, the latter is tilted about an axis formed by the mounting pins, wherein the end which is mounted on the mounting pins moves through the channel. Said end of the valve flap is therefore not in contact in an interfering manner with the air flow. In addition, the channel as a water drainage channel can serve for removing water passing onto the ventilation valve from the outside, for example spray swirled up by the tires of the vehicle. Owing to the mounting pins extending in the main flow direction, sufficient space for such a channel is created without the cross-sectional area of the at least one through opening being substantially impaired.

According to a further refinement, the at least one valve flap has rounded corners. The at least one valve flap is designed in particular in a manner corresponding to the at least one through opening. For example, the at least one valve flap can be of polygonal, in particular square, design—corresponding to the wall bounding the through opening. In particular, the wall bounding the at least one through opening can have rounded edges here, as explained above. The corners of the valve flap can then be correspondingly rounded. The corners formed at the free end of the valve flap that is not connected to the valve frame are preferably rounded. By means of the rounding of the corners of the valve flap, sharp edges in the air flow are avoided and therefore the air flow is configured to be more efficient and, in particular, fluttering of the valve flap is suppressed.

The invention also achieves the object by a vehicle with a ventilation valve as claimed in one of the preceding refinements.

BRIEF DESCRIPTION OF THE DRAWINGS

An exemplary embodiment of the invention will be described below with reference to figures, in which.

Unless stated otherwise, the same reference signs denote identical objects.

DETAILED DESCRIPTION

Figure 1:
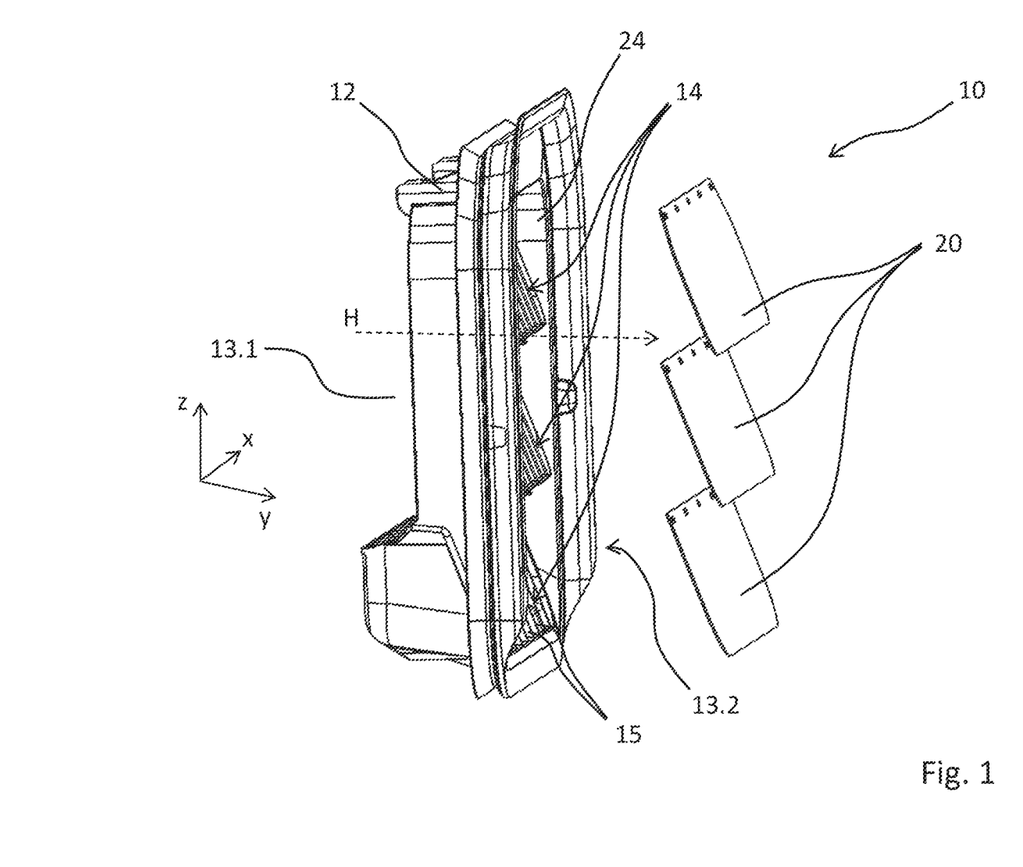
FIG. 1 shows a ventilation valve according to the invention in a perspective view with detached valve flaps.

FIG. 1 shows one refinement of the ventilation valve according to the invention in a perspective view. The ventilation valve 10 comprises a valve frame 12 in which three through openings 14 are formed. The through openings 14 are each bounded by a wall 16 of the valve frame 12 and are spaced apart from one another by webs 18, as can be seen in particular in FIGS. 4 and 5. The wall 16 is also formed here by the webs 18. A plurality of ribs 15 in each case extend through the through openings 14. In a closed position of the ventilation valve 10, the through openings 14 are concealed by valve flaps 20, wherein the valve flaps 20 lie against the walls 16 on supporting surfaces 26. In the present exemplary embodiment, the valve flaps 20 come into contact with the ribs 15 only in the event of a negative pressure prevailing in the vehicle interior. For this purpose, the ribs 15 are slightly set back within their respective through opening 14 counter to the main flow direction H. The valve flaps 20 are of elastic design, are composed, for example, of rubber, in particular of NBR, of EPDM or TPE, and, in the installed state of the ventilation valve in a vehicle, are held in their closed position by gravity. For this purpose, the through openings 14 are inclined in relation to the vertical, i.e. in relation to the Z direction, as can be seen in particular in FIG. 1. The valve flaps 20 can therefore be reliably held in the closed position by gravity.

If air then emerges from the ventilation valve 10, for example because of a positive pressure prevailing in a vehicle interior, an air flow arises which flows from an air inlet side 13.1 to an air outlet side 13.2 of the valve frame 12 and flows along the Y axis substantially in a main flow direction H. By means of this air flow, the deformable valve flaps 20 are raised from the valve frame 12 and curved outward. The air flow can thereby emerge from the ventilation valve 10. The air flow can be deflected here from the main flow direction by the valve flaps, depending on the opening angle of the valve flaps 20.

Figure 4:
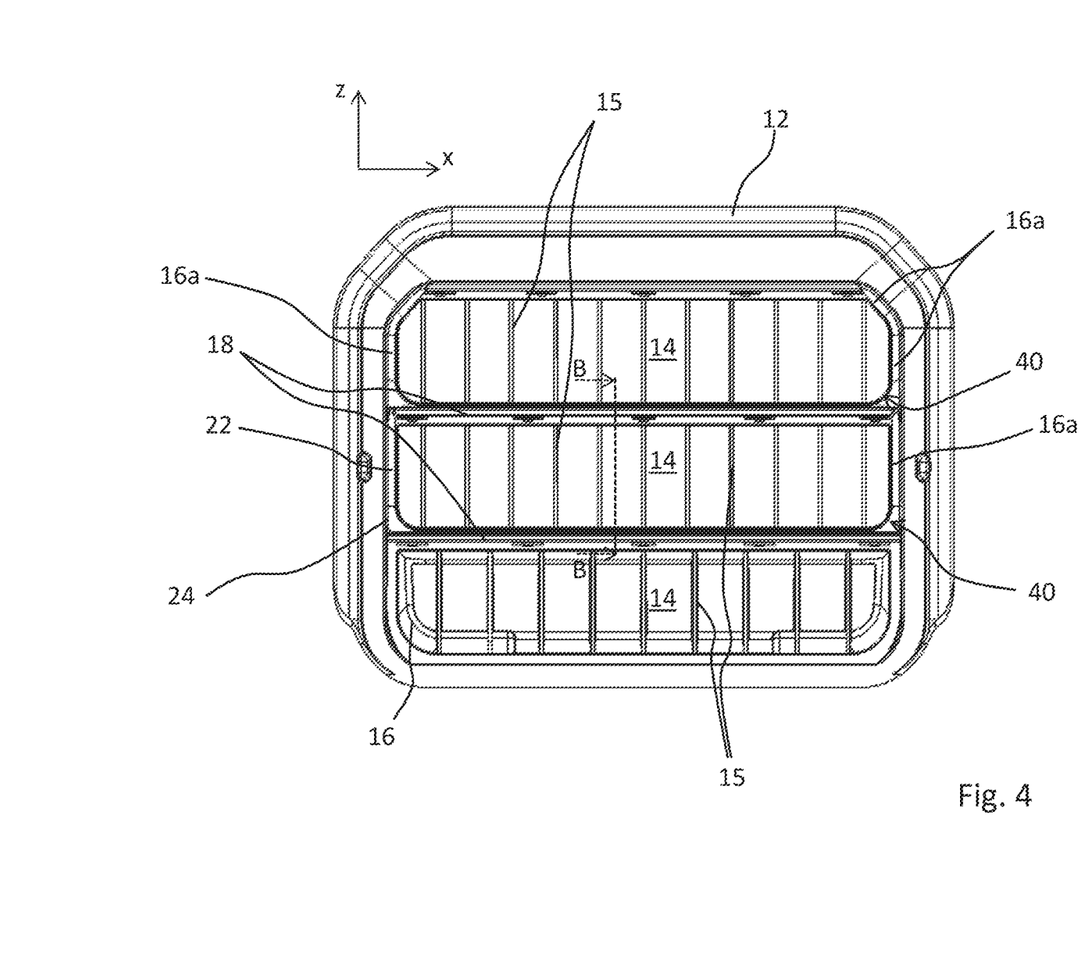
FIG. 4 shows the ventilation valve from FIG. 2 without valve flaps.
Figure 5:
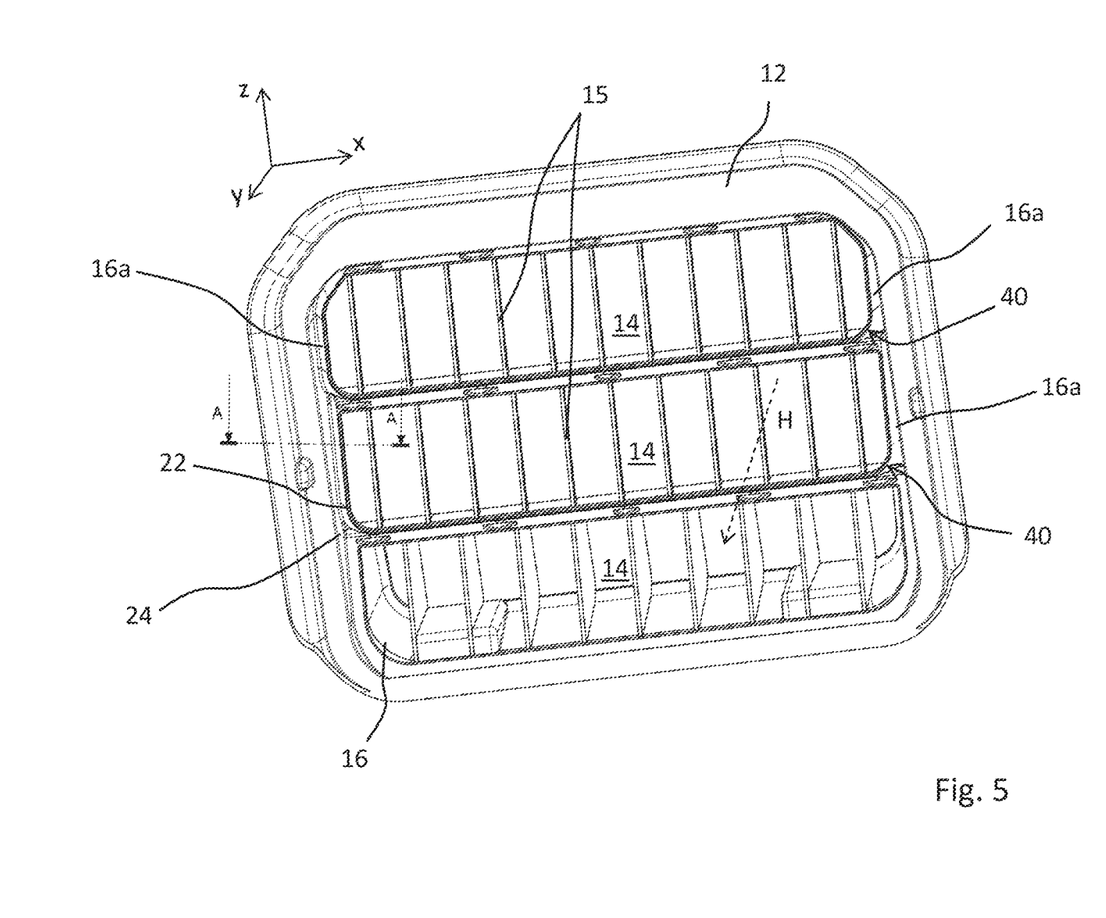
FIG. 5 shows the ventilation valve from FIG. 4 in a perspective view.
Figure 6:
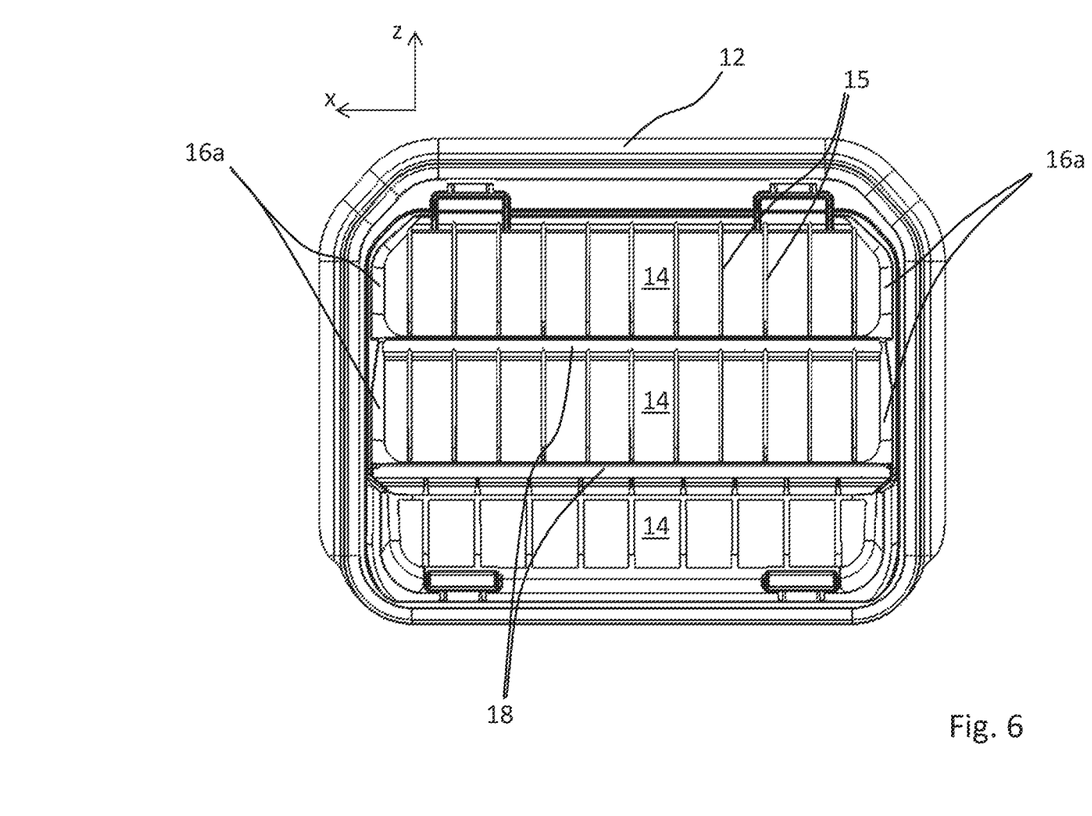
FIG. 6 shows a rear view of the ventilation valve from FIG. 1.
Figure 7:
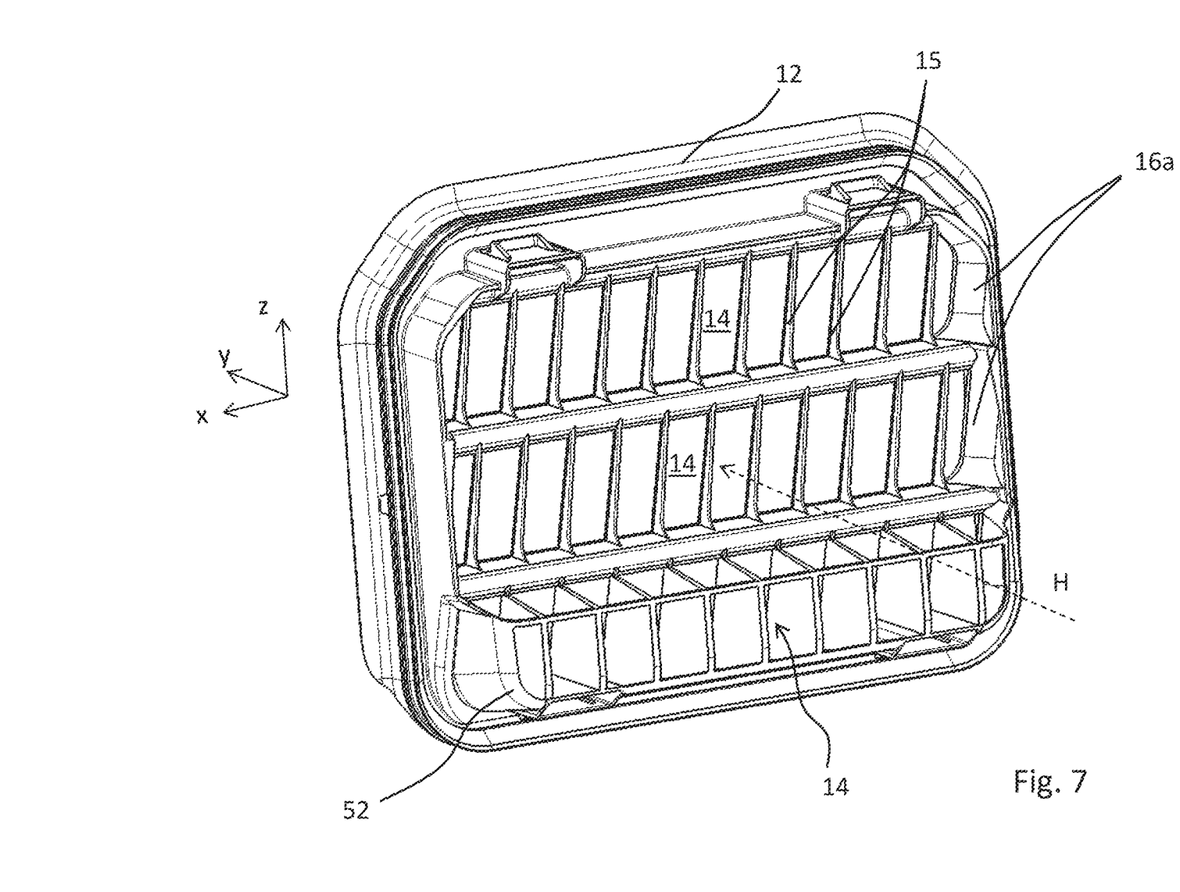
FIG. 7 shows the ventilation valve from FIG. 6 in a tilted view.

According to the invention, it is provided here that the walls 16 bounding the through openings 14 are inclined at least in sections into the air flow in such a manner that the through openings 14 taper in the main flow direction H. This can be seen in particular in FIGS. 4 to 7. FIGS. 4 and 5 show the ventilation valve from the front—i.e. looking counter to the main flow direction—while FIGS. 6 and 7 show the ventilation valve from the rear—i.e. looking in the main flow direction. Each of the through openings 14 is bounded by an encircling wall 16, wherein the walls 16 are formed by that portion of the valve frame 12 which surrounds the respective through opening 14 and by the webs 18. The walls 16 are not all inclined here fully into the air flow, but rather only with their wall portions denoted by the reference sign 16a. The walls 16 of the upper through opening 14 and of the central through opening 14 are in each case inclined into the air flow only along the substantially vertically running wall portions 16a. The wall 16 of the lowermost through opening 14 is not inclined into the air flow. Instead, the lower through opening 14 has a water trough 52 for collecting and removing water reaching the ventilation valve (see FIG. 7). It can be seen in FIGS. 6 and 7 that the through openings 14 taper in the main flow direction H, pointing here into the plane of the figure. By this means, the flow velocity is increased and a more efficient conduction of air is ensured. In addition, dead water zones in the air flow are avoided, as explained above. The inclined walls 16a also have rounded edges 40. By this means, sharp edges in the air flow are avoided and therefore the air resistance is further reduced. Furthermore, fluttering of the valve flaps 20, i.e. a high-frequency movement of the valve flaps forward and back in the air flow, is thus reduced. The rounded corners 21 of the valve flaps 20 also contribute thereto.

Figure 8:
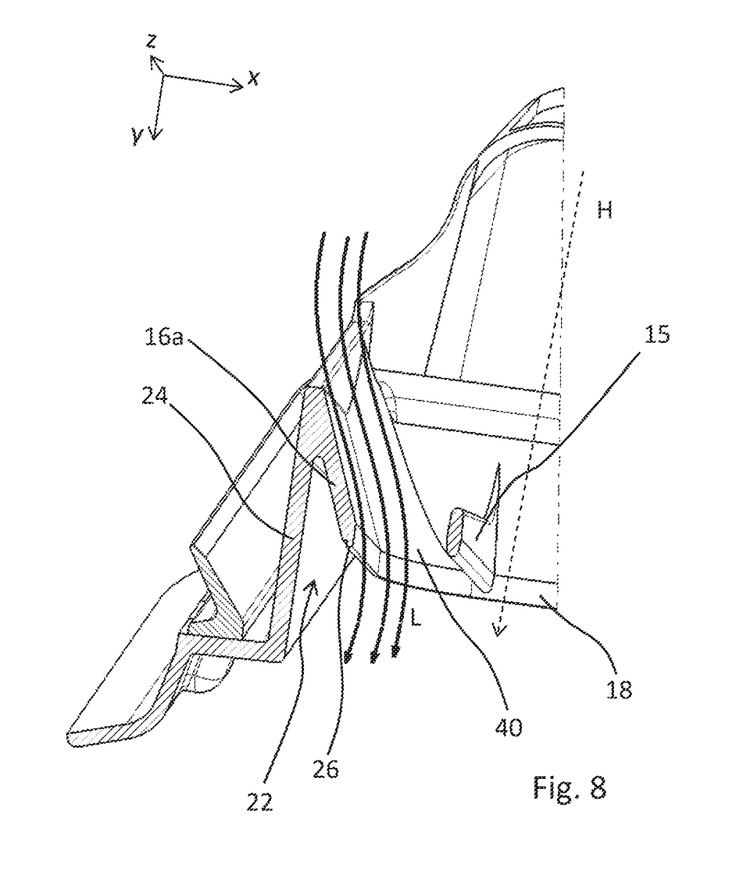
FIG. 8 shows a sectional view through the ventilation valve along the intersecting line A-A shown in FIG. 5.

FIG. 8 shows a detail of the ventilation valve 10 in a sectional view along the intersecting line A-A, which is illustrated in FIG. 5, through the central through opening 14. One of the inclined wall portions 16a can be seen here. This leads to a deflection of the air flow L occurring there, as illustrated by the arrows. Furthermore, a water drainage channel 22 which extends between an outer side of the tapering wall 16a and an outer wall 24 can be seen in FIG. 8. The outer wall 24 runs here along the main flow direction, but can also be tilted in relation thereto. The water drainage channel 22 serves for collecting and removing spray passing onto the outer side of the ventilation valve 10. Owing to the inclined wall 16a, the water drainage channel 22 is particularly wide and expands in the main flow direction H. The valve flap 20 concealing the through opening 14 lies—in a manner not illustrated—against the supporting surface 26 in the closed position. By means of the inclined wall portions 16a according to the invention, capillary effects are suppressed in the above-explained manner and the conducting away of water is improved. In particular, owing to a reduction of sharp edges, dead water zones in the air flow are reduced. This reduces the air resistance.

Figure 9:
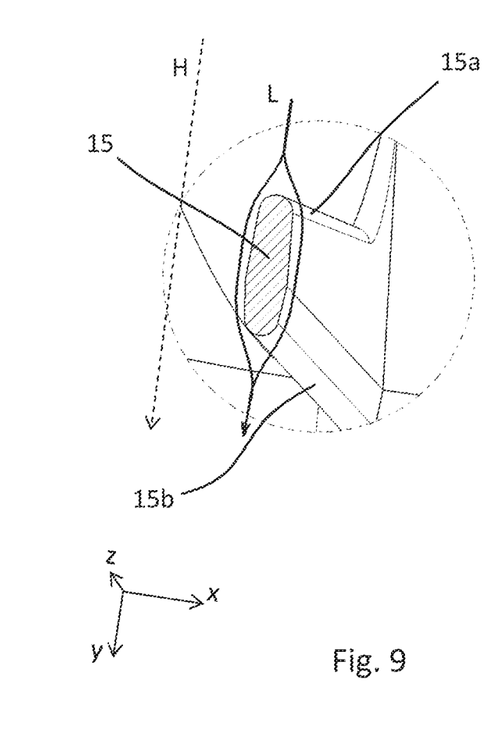
FIG. 9 shows a detail of FIG. 8.

In addition, one of the ribs 15 is illustrated in FIG. 8 and in particular in FIG. 9. As can be seen here, the ribs 15 have rounded end edges 15a, 15b. By means of such a wing-shaped configuration of the ribs 15, vortices in the air flow and in particular a flow separation are avoided and therefore the flow resistance is reduced.

Figure 10:
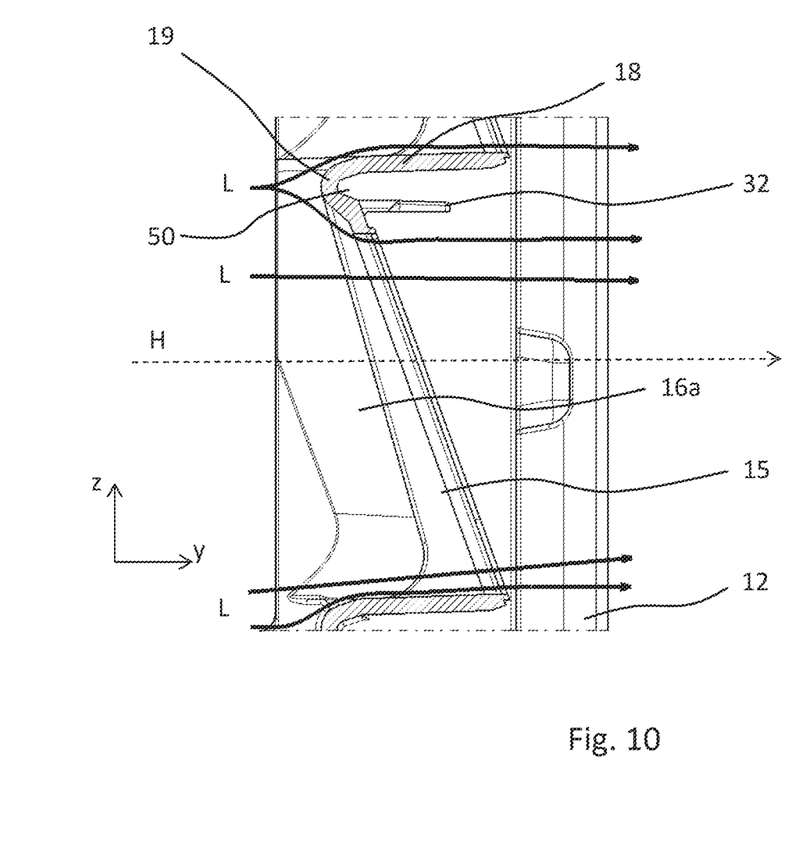
FIG. 10 shows a sectional view of the ventilation valve along the intersecting line identified by B-B in FIG. 4.
Figure 11:
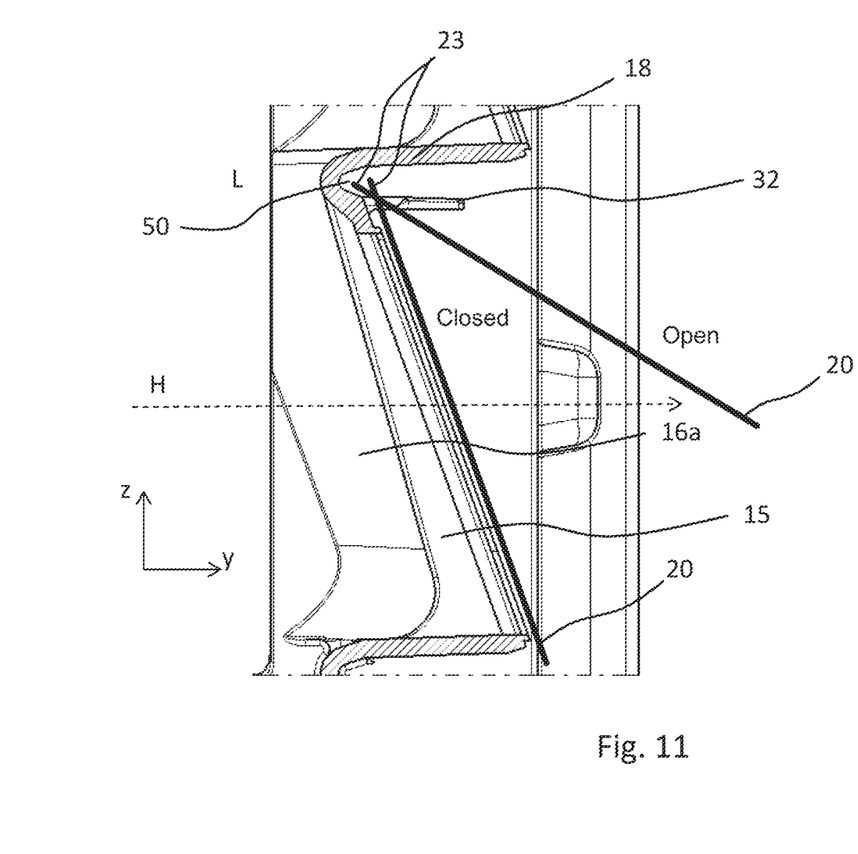
FIG. 11 shows the illustration from FIG. 10 with the valve flap in the open position and in the closed position.

FIG. 10 shows a sectional view along the intersecting line B-B, which is illustrated in FIG. 4, through the central through opening 14. The air flow L flowing through the ventilation valve is illustrated by arrow lines. It can be seen in particular here that the webs 18 are also rounded at their upstream ends 19 in order to reduce the flow resistance. Furthermore, an arrow-shaped mounting pin 30, pointing in the main flow direction, or a centering pin 32, and a channel 50 located therebehind can be seen in FIG. 10. The mounting pins 30 serve for attaching the valve flaps 20 to the valve frame 12. The centering pin 32 serves for centering the valve flap 20 during the attaching of the latter to mounting pins 30 of the valve frame 12, as will also be explained further below. The channel 50 located therebehind serves firstly for receiving that end 23 of the respective valve flap 20 which is mounted on the mounting pins 30, as is apparent in FIG. 11. The valve flap 20 can be seen here in an open position "open" and in a closed position "closed". During an opening movement of the valve flap 20 from the closed position into the open position, the valve flap 20 is moved about an axis running in the X direction (into the plane of the drawing) along the mounting pins 30, wherein the upper end 23 of the valve flap 20 moves within the channel 50. The centering pin 32 also lies on said axis. In addition, the channel 50 serves as a water drainage channel.

Figure 2:
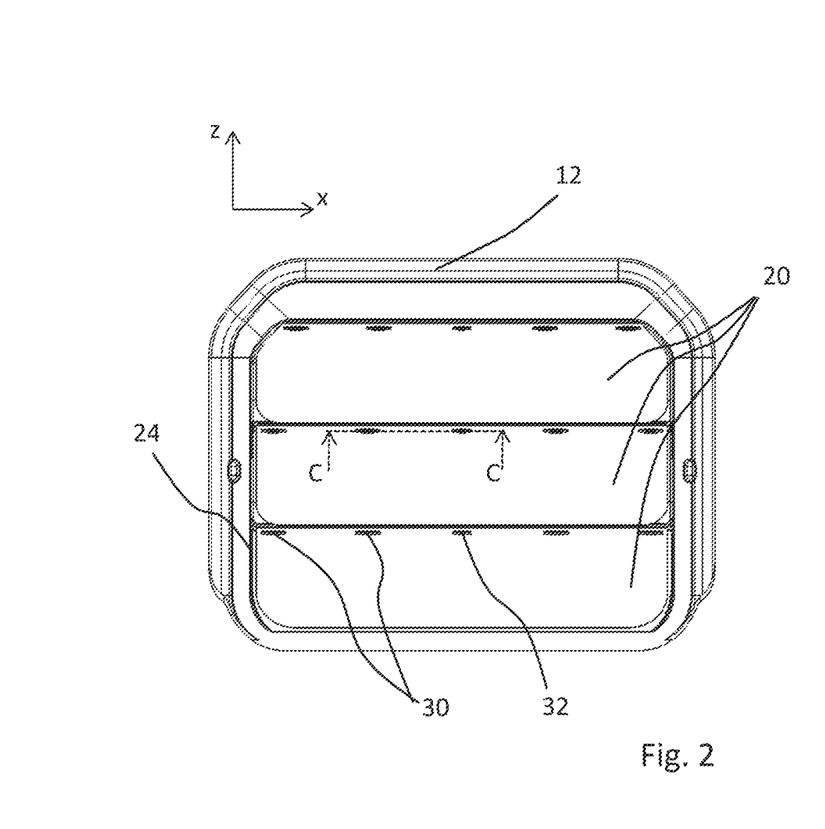
FIG. 2 shows a front view of the ventilation valve from FIG. 1 with valve flaps which are fastened to the valve frame and are in the closed position.
Figure 3:
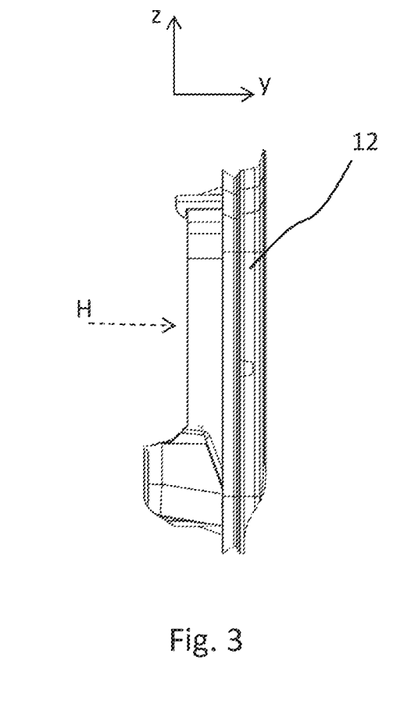
FIG. 3 shows a side view of the ventilation valve from FIG. 1.
Figure 12:
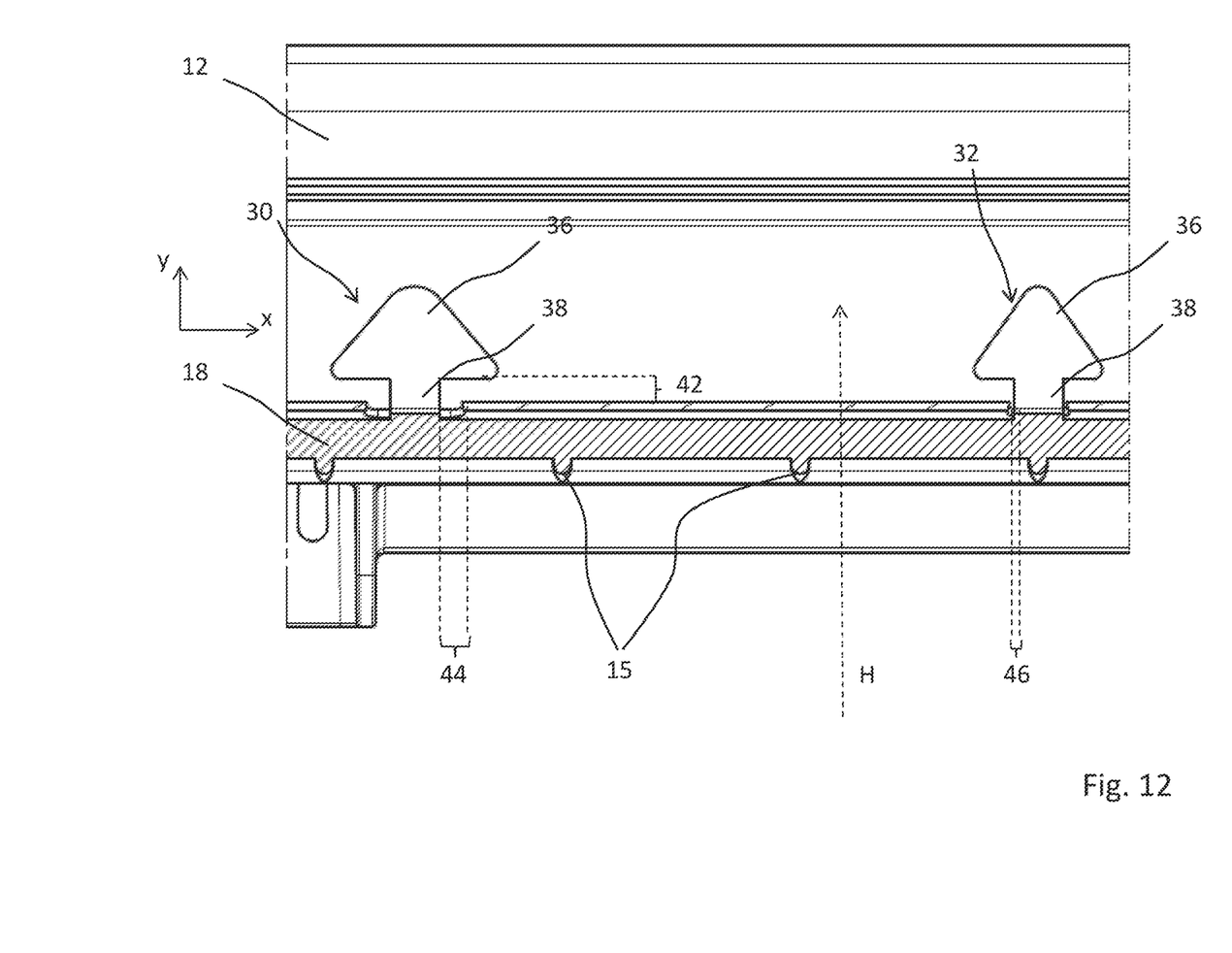
FIG. 12 shows a sectional view of the ventilation valve along the intersecting line identified by C-C in FIG. 2.
Figure 13:
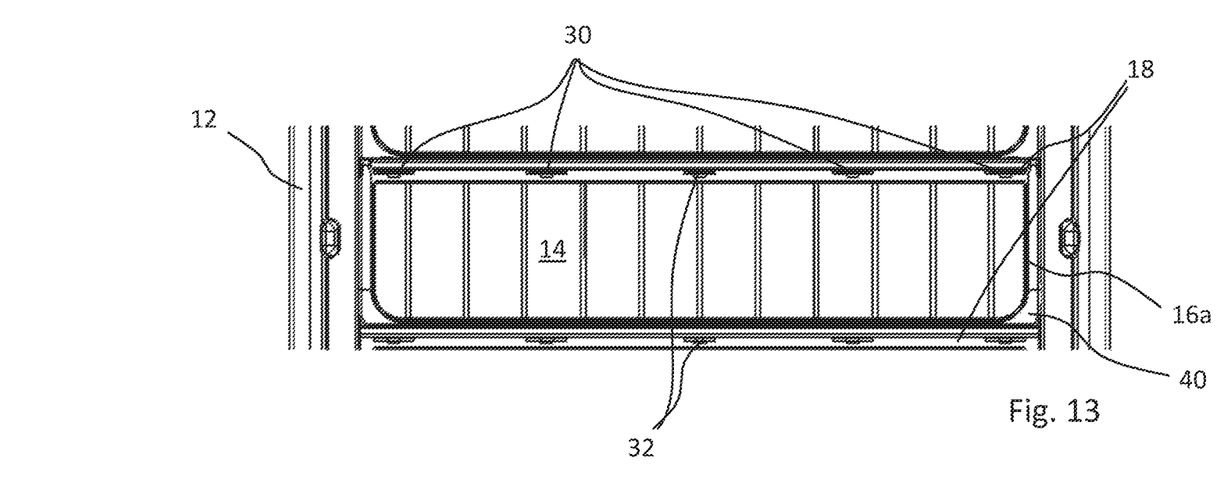
FIG. 13 shows a detailed view of FIG. 4.
Figure 14:
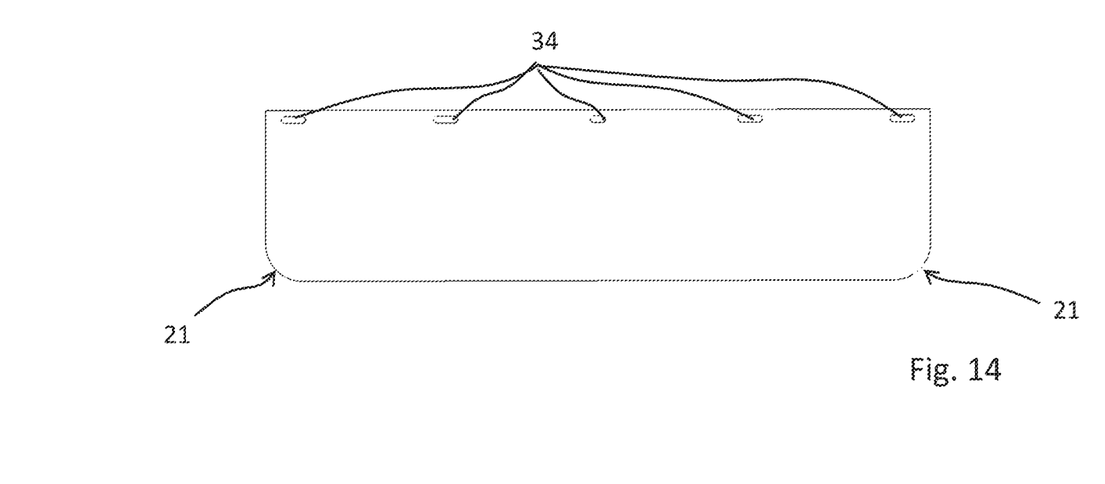
FIG. 14 shows a front view of a valve flap.

The mounting pins 30 can be seen in detail in FIGS. 12 to 14. As is apparent in FIG. 13, the wall 16 of each through opening 14 in each case has four mounting pins 30 and a centering pin 32, wherein it is of course possible also for more or fewer mounting pins and centering pins to be provided. The valve flaps 20 have correspondingly designed receiving openings 34, as can be seen in FIG. 14. For the attaching of the valve flaps 20, the receiving openings 34 are brought to coincide with the mounting pins 30 and the centering pin 32 and the valve flaps 20 are pressed against the valve frame 12 such that the arrow-shaped pins 30, 32 pass through the corresponding receiving openings 34. The receiving openings 34 here first of all pass a relatively wide arrow head 36 of the mounting pins 30 and of the centering pin 32. After passing the arrow heads 36, the valve flaps 20 are mounted via their receiving openings 34 on arrow shafts 38 of the mounting pins 30 and of the centering pin 32. FIG. 12 shows a section through the ventilation valve along the intersecting line identified by C-C in FIG. 2. It is identified by the reference sign 42 in FIG. 12 how much movement clearance of a mounted valve flap 20 remains in the Y direction, i.e. in the main flow direction. The valve flap 20 can open more easily the greater said movement clearance is. It is indicated by the reference sign 44 which movement clearance of the valve flap 20 remains in the X direction. The movement clearance 44 in the X direction is produced here from the ratio of the width of the arrow shafts 38 to the width of the receiving openings 34 of the valve flaps 20, wherein the width refers to the extent in the X direction. The corresponding movement clearance 46 produced by the centering pin 32 is smaller here. The centering pin 32 can therefore serve as a centering element during the attaching of the valve flaps 20 to the valve frame 12. The mounting pins 36 arranged on both sides of the centering pin 32 have a greater error tolerance because of their larger movement clearance 42, as explained above. In addition, an upper end of the ribs 15 can be seen.

Figure 15:
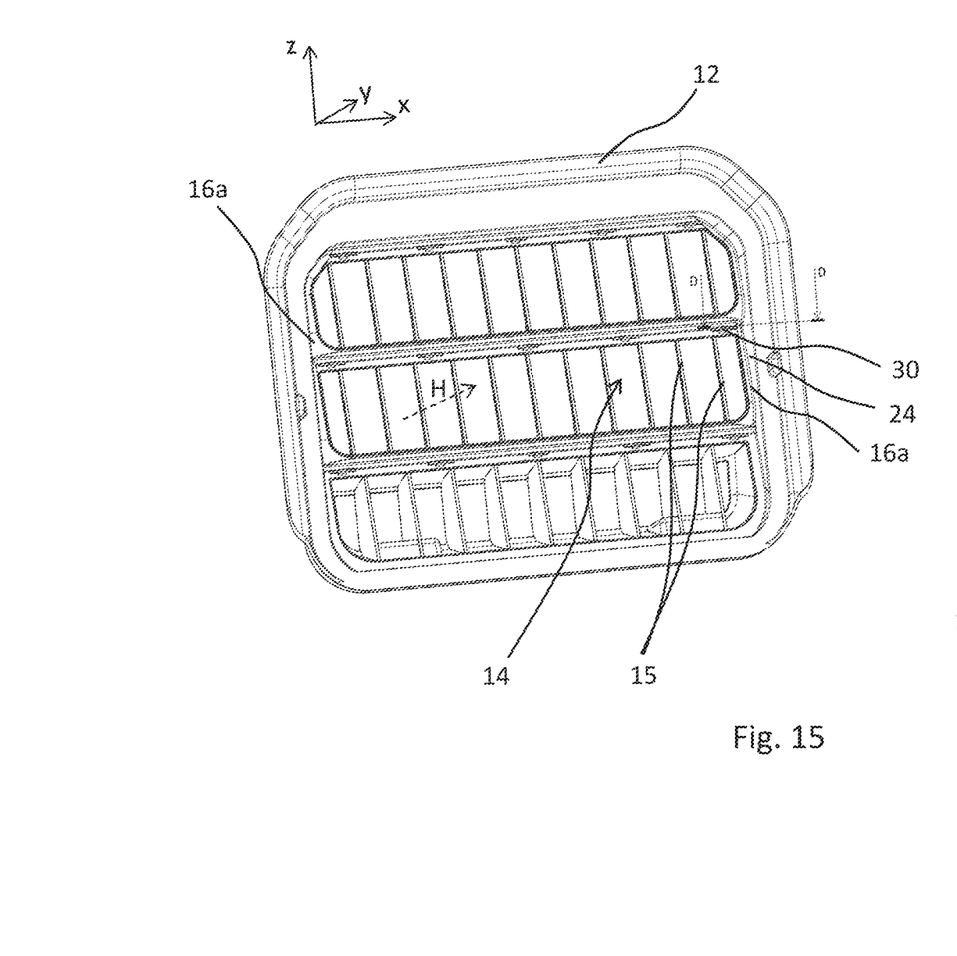
FIG. 15 shows a further perspective front view of the ventilation valve.
Figure 16:
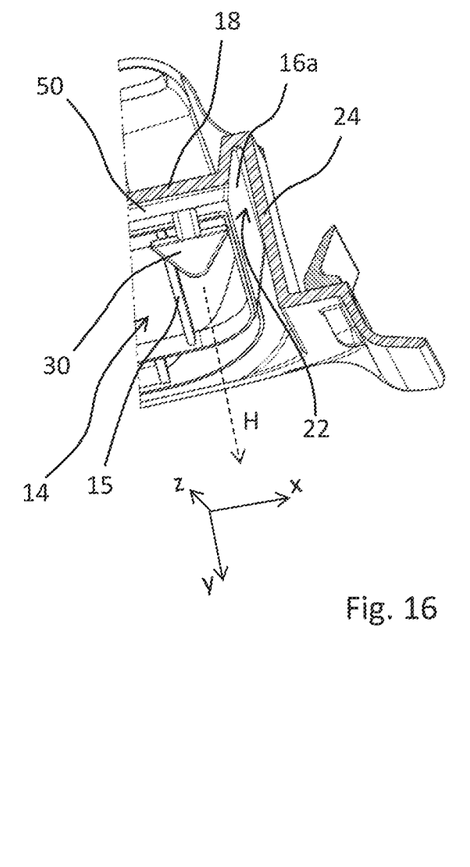
FIG. 16 shows a sectional view of the ventilation valve along the intersecting line identified by D-D in FIG. 15.

FIG. 15 shows the ventilation valve 10 in a further perspective front view. FIG. 16 shows a section through the ventilation valve along the intersecting line identified by D-D in FIG. 14. The view of one of the mounting pins 30 is made possible here. In particular, the transition between the water drainage channel 22 and the channel 50 which likewise acts as a water drainage channel can be seen. Water which has accumulated in the channel 50 can therefore enter the respective water drainage channel 22 at the ends of the webs 18 and can be removed downward.

LIST OF REFERENCE SIGNS

10 Ventilation valve
12 Valve frame
13.1 Air inlet side
13.2 Air outlet side
14 Through openings
15 Ribs
15a Upstream end edge
15b Downstream end edge
16 Walls
16a Inclined wall portions of the walls
18 Webs
19 Upstream ends of the webs
20 Valve flaps
21 Rounded corners of the valve flaps
22 Water drainage channel
23 Upper end of the valve flaps
24 Outer wall
26 Supporting surface
30 Mounting pins
32 Centering pin
34 Receiving openings
36 Arrow heads
38 Arrow shafts
40 Rounded edges
42 Movement clearance in the Y direction
44 Movement clearance in the X direction
46 Movement clearance of the centering pin in the X direction
50 Channel
52 Water trough
H Main flow direction
L Air flow

What is claimed is:

1. A ventilation valve for a vehicle for letting air out of a vehicle interior, comprising a valve frame with at least one through opening, and at least one valve flap which is mounted on the valve frame and is adjustable between a closed position and an open position, wherein the at least one valve flap closes the at least one through opening in the closed position and opens up the at least one through opening in the open position, wherein air escaping through the at least one through opening flows from an air inlet side to an air outlet side along a main flow direction, wherein the frame includes an inclined wall bounding the at least one through opening, wherein the inclined wall is inclined into the air flow in such a manner that the through opening tapers in the main flow direction, wherein the at least one valve flap lies against a downstream supporting surface of the inclined wall when the at least one valve flap is in the closed position, wherein, at the air outlet side of the valve frame, the valve frame further includes an outer wall spaced outward of and alongside an outer side of the inclined wall such that a space between the outer wall and the outer side of the inclined wall forms a water drainage channel on the air outlet side of the valve frame between the outer wall and the outer side of the inclined wall, wherein part of the outer wall and the space forming the water drainage channel run counter to the main flow direction and extend upstream of the downstream supporting surface of the inclined wall.

2. The ventilation valve as claimed in claim 1, wherein the water drainage channel expands in the main flow direction.

3. The ventilation valve as claimed in claim 1, which comprises at least one rib extending through the at least one through opening perpendicular to the main flow direction for holding back the at least one valve flap during a movement counter to the main flow direction, wherein the at least one rib is rounded on a downstream end edge and/or on an upstream end edge.

4. The ventilation valve as claimed in claim 1, wherein the inclined wall bounding the at least one through opening has rounded edges.

5. The ventilation valve as claimed in claim 1, which comprises arrow-shaped mounting pins which are arranged on the valve frame and run in the main flow direction for attaching the at least one valve flap, wherein the at least one valve flap has receiving openings corresponding to the mounting pins.

6. The ventilation valve as claimed in claim 5, which comprises at least one centering pin which is arranged on the valve frame and runs in the main flow direction for centering the at least one valve flap during the attaching to the valve frame, wherein the at least one valve flap has at least one receiving opening corresponding to the centering pin.

7. The ventilation valve as claimed in claim 5, which comprises a channel which runs horizontally above the mounting pins in the installed state of the ventilation valve.

8. The ventilation valve as claimed in claim 1, wherein the at least one valve flap has rounded corners.

9. A vehicle comprising a ventilation valve as claimed in claim 1.

10. A ventilation valve for a vehicle for letting air out of a vehicle interior, comprising: a valve frame with at least one through opening, at least one valve flap mounted on the valve frame and adjustable between a closed position and an open position, wherein the at least one valve flap closes the at least one through opening in the closed position and opens up the at least one through opening in the open position, wherein air escaping through the at least one through opening flows from an air inlet side to an air outlet side along a main flow direction, wherein a wall bounding the at least one through opening includes substantially vertically running and opposite wall portions that are inclined into the air flow in such a manner that the through opening tapers so as to narrow the at least one through opening progressively along the main flow direction.

11. The ventilation valve as claimed in claim 10, further comprising at least one rib extending through the at least one through opening perpendicular to the main flow direction for holding back the at least one valve flap during a movement counter to the main flow direction, wherein the at least one rib is rounded on a downstream end edge and/or on an upstream end edge.

12. The ventilation valve as claimed in claim 10, wherein the wall bounding the at least one through opening has rounded edges.

13. The ventilation valve as claimed in claim 10, further comprising arrow-shaped mounting pins arranged on the valve frame and running in the main flow direction for attaching the at least one valve flap, wherein the at least one valve flap has receiving openings corresponding to the mounting pins.

14. The ventilation valve as claimed in claim 13, further comprising at least one centering pin arranged on the valve frame and running in the main flow direction for centering the at least one valve flap during the attaching to the valve frame, wherein the at least one valve flap has at least one receiving opening corresponding to the centering pin.

15. The ventilation valve as claimed in claim 13, wherein a channel which runs horizontally above the mounting pins in the installed state of the ventilation valve.

16. A vehicle comprising a ventilation valve as claimed in claim 10.

17. A ventilation valve for a vehicle for letting air out of a vehicle interior, comprising: a valve frame with at least one through opening, at least one valve flap mounted on the valve frame and adjustable between a closed position and an open position, wherein the at least one valve flap closes the at least one through opening in the closed position and is raised in the open position to open up the at least one through opening in the open position, wherein air escaping through the at least one through opening flows from an air inlet side to an air outlet side along a main flow direction, wherein a wall bounding the at least one through opening includes a substantially vertically running wall portion that is inclined into the air flow in such a manner that the through opening tapers so as to narrow the at least one through opening progressively along the main flow direction, wherein the air outlet side of the valve frame includes an outer wall spaced outward of an outer side of the substantially vertically running wall portion so as to form a water drainage channel on the air outlet side of the valve frame between the outer wall and the outer side of the substantially vertically running wall portion.

* * * * *